United States Patent [19]
Reed et al.

[11] Patent Number: 5,820,989
[45] Date of Patent: Oct. 13, 1998

[54] METHOD OF PROCESSING "BPS" GLASS CERAMIC AND SEALS MADE THEREWITH

[75] Inventors: Scott T. Reed; Ronald G. Stone; Howard L. McCollister, all of Albuquerque; Paul R. Wengert, deceased, late of Albuquerque, all of N. Mex., by Cynthia Ann Buzan, legal representative

[73] Assignee: Sandia Corporation, Albuquerque, N. Mex.

[21] Appl. No.: 706,852

[22] Filed: Sep. 3, 1996

(Under 37 CFR 1.47)

[51] Int. Cl.$^6$ ...................................................... B32B 17/06
[52] U.S. Cl. ........................ 428/426; 428/34.4; 428/35.7; 428/36.9
[58] Field of Search .................................. 428/34.4, 35.7, 428/36.9, 119, 426

[56] References Cited

U.S. PATENT DOCUMENTS

| | | | |
|---|---|---|---|
| 2,392,314 | 1/1946 | Dalton | 106/54 |
| 3,220,815 | 11/1965 | McMillan et al. | 65/32 |
| 3,564,587 | 2/1971 | Ellis | 161/93 |
| 4,414,282 | 11/1983 | McCollister et al. | 428/433 |
| 4,536,203 | 8/1985 | Kramer | 65/29 |
| 4,921,738 | 5/1990 | Cassidy | 428/34.6 |

*Primary Examiner*—Terressa Mosley
*Attorney, Agent, or Firm*—George H. Libman

[57] ABSTRACT

A glass ceramic composition, a glass ceramic-to-metal seal, and more specifically a hermetic glass ceramic-to-metal seal prepared by subjecting a glass composition comprising, by weight percent, $SiO_2$ (65–80%), $LiO_2$ (8–16%), $Al_2O_3$ (2–8%), $K_2O$ (1–8%), $P_2O_5$ (1–5%), $B_2O_3$ (0.5–7%), and ZnO (0–5%) to the following processing steps: 1) heating the glass composition in a belt furnace to a temperature sufficient to melt the glass and crystallize lithium phosphate, 2) holding at a temperature and for a time sufficient to create cristobalite nuclei, 3) cooling at a controlled rate and to a temperature to cause crystallization of lithium silicates and growth of cristobalite, and 4) still further cooling in stages to ambient temperature. This process produces a glass ceramic whose high coefficient of thermal expansion (up to $200 \times 10^{-7}$ in/in/°C.) permits the fabrication of glass ceramic-to-metal seals, and particularly hermetic glass ceramic seals to nickel-based and stainless steel alloys and copper.

39 Claims, 3 Drawing Sheets

METHOD OF PROCESSING "BPS" GLASS CERAMIC AND SEALS MADE THEREWITH

This invention was made with Government support under Contract No. AC04-76DP00789 awarded by the United States Department of Energy. The Government has certain rights in the invention.

BACKGROUND OF THE INVENTION

This invention relates to an improved method for glass ceramic-to-metal seals and particularly hermetic glass ceramic seals to nickel based and stainless steels alloys using a "traveling, continuous belt" (hereinafter referred to as "belt") furnace for processing U.S. Pat. No. 2,392,314 to Dalton discloses glass material for matched thermal expansion sealing to molybdenum and alloys of iron, nickel, and cobalt metal wherein the amount of $Li_2O$ in the glass composition is only 0.8%.

U.S. Pat. No. 3,220,815 to McMillan et al. discloses a devitrified glass (glass ceramic) having an coefficient of thermal expansion (CTE) of $142 \times 10^{-7}$ in/in/°C. This can be used for sealing to Mesmeric steel having a CTE of $140 \times 10^{-7}$ in/in/°C. The glass contains 10–59% ZnO in addition to $Li_2O$ and $SiO_2$.

U.S. Pat. No. 3,564.587 to Ellis discloses a complex glass composition suitable for sealing to low CTE glasses and metals.

U.S. Pat. No. 4,414,282 to McCollister et al. discloses a high CTE glass ceramic (S glass ceramic) similar to, but not the same as, that of the present invention. McCollister uses either a four-step or six-step batch-process heat treatment (meaning the parts remain stationary in the furnace as distinct from moving through the furnace with defined temperature zones on a traveling belt) of the glass compositions rather than the belt processing taught in the present invention. The CTE of McCollister's glass ceramic is 120 to $160 \times 10^{-7}$ in/in/°C. with a preferred CTE of $145 \times 10^{-7}$ in/in/°C., whereas the CTE of the BPS glass ceramic of the present invention is 120 to $200 \times 10^{-7}$ in/in/°C. with, for example, a preferred CTE of $145 \times 10^{-7}$ in/in/°C. for seals to Inconel and a CTE of $165 \times 10^{-7}$ in/in/°C. for seals to stainless steels. McCollister's glass ceramic composition, when processed according to the present invention, will not have the desired high CTE or the crystalline structure which contains cristobalite. The crystalline microstructure of the glass ceramic composition of the present invention is the same as that taught by McCollister.

US Pat. No. 4,536,203 to Kramer discloses control of the CTE in hermetic glass ceramic-to-metal seals not only by batch heat treatment but also heat treating using pressures up to 22,000 psi.

US. Pat. No. 4,921,738 to Cassidy discloses an improved high CTE glass ceramic interface for sealing to metals. Cassidy uses a glass ceramic composition within McCollister's preferred compositional range, and McCollister's batch four step heat treatment. However Cassidy uses metals other than Inconel 718 or Inconel 625.

Borom et al. in the Journal of the American Ceramic Society 58, 385–391 (Sept.-Oct., 1975) discloses a glass composition, the ingredients of which are similar to those of the present invention, but which are not useful as sealants to metals of the present invention.

McMillan in "Glass-Ceramics," 2nd. Edition, Academic Press (1979), pp 160–162, discusses the beneficial effect on chemical stability of alumina and zinc oxide on the silica-rich phase of glass ceramics.

SUMMARY OF THE INVENTION

Nickel base alloys such as Inconel 718, Inconel 625, and Hastelloy C are particularly suitable for sealing with certain known hard borosilicate glasses because, with respect to their expansion characteristics, these alloys more nearly resemble the glasses than other previously employed sealing materials.

In making a strong chemical bond between a metal and a glass or glass ceramic, it is not only essential that the expansion characteristics of the alloy and the glass be sufficiently well matched to reduce residual stress in the seal, but it is equally desirable that the glass have the highest possible corrosion resistance. It is also important that the melting temperature of the glass be sufficiently low to permit production of the glass or glass ceramic in conventional furnaces. It is also desirable that the expansion and viscosity be such that the glass is capable of sealing to nickel-base alloys and stainless steels. It is further desirable that the glass have a high mechanical strength so that the hermetic seal can withstand high external stresses.

The prior-art glasses used for sealing with nickel based alloys have not been satisfactory in all respects and, although certain desirable properties may be obtained at the sacrifice of others, no single glass possesses all of the above-mentioned desirable properties except that described by McCollister. No prior glass or glass ceramic has been entirely satisfactory for sealing to stainless steels.

Today most hermetic glass-to-metal seals are manufactured in belt furnaces. These hermetic devices cannot withstand high temperatures or high stresses. High CTE glass ceramics sealed to Inconels and Hastelloys can withstand high temperatures and high stresses, but these seals must be manufactured in batch furnaces in order to closely follow the prescribed thermal treatment necessary to nucleate and grow the desired crystal phases. These batch furnaces are not usually used by glass-to-metal seal manufacturers.

Belt-processable S (BPS) glass ceramic (as distinguished from S glass ceramic made in a batch furnace), through the process disclosed in the present invention, forms hermetic high-strength seals to Inconel, Hastelloy, Haynes alloys, and copper. High-strength seals can also be made using 304 stainless steel as well as nitronic steel bodies, and 330 or 333 stainless steel pins with the disclosed glass ceramic of the present invention by belt processing. Hermetic seals should also be possible using BPS glass ceramic and the metal alloys disclosed by Cassidy. The thermal treatment of the glass ceramic of this invention is critical to the formation of the necessary crystal phases, especially the time and temperature in the melt zone of the belt furnace and the cooling rate to 700° to 750° C.

An object of the present invention is to make high-performance glass ceramic hermetic seals to high-CTE metals.

A further object of the present invention is to preferably make these seals in a belt furnace but in a batch furnace as well.

A still further object of the present invention is to use pressed powder preforms as the source of the glass ceramic rather than solid glass preforms.

A still further object of the present invention is to provide drop-in glass ceramic replacements for conventional glass preforms.

A still further object of the present invention is to improve the reliability, strengths and performance of hermetically sealed devices with improved corrosion resistance and thermal shock resistance.

BRIEF DESCRIPTION OF THE DRAWINGS

The accompanying drawings, which are incorporated in and form part of the specification, illustrate embodiments of the present invention and, together with the description, serve to explain the principles of the invention.

DETAILED DESCRIPTION OF THE INVENTION

Figure 1:
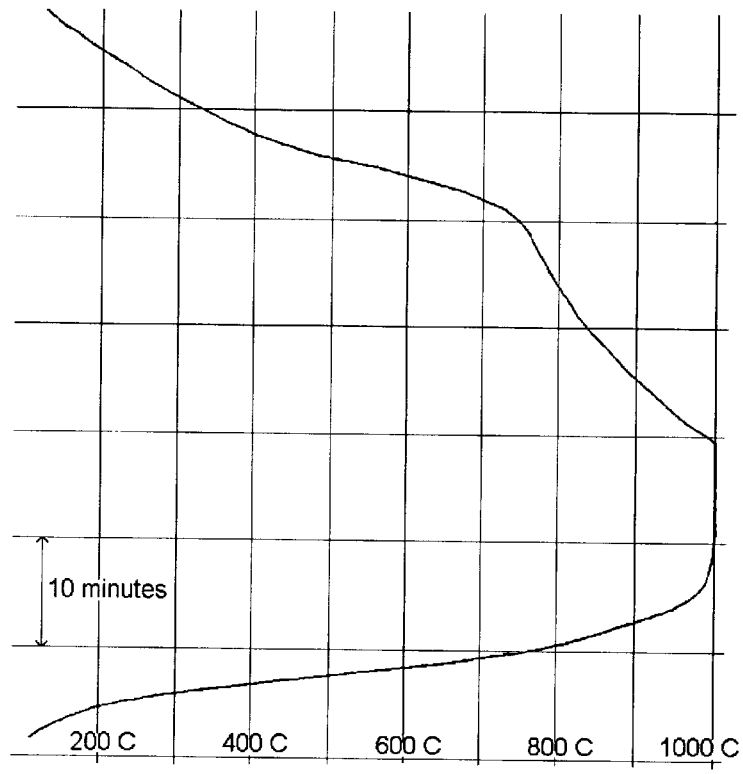
FIG. 1 is a graph representing the crystallizing temperature profile which is typically employed in a belt furnace used in the preparation of the device of FIG. 4B.

Glass ceramic compositions containing, by weight, $SiO_2$ (65–80%), $Al_2O_3$ (2–8%), $B_2O_3$ (0.5–7%), $P_2O_5$ (1–5%), $K_2O$ (1–8%), $Li_2O$ (8–16%), and ZnO (0–5%) are particularly suitable for sealing with the nickel-base alloys, stainless steels, and copper, have a better chemical durability and mechanical strength than prior glasses and glass ceramics used for this purpose, and are easier to manufacture than prior glass ceramics.

In Table I preferred examples of the BPS-glass ceramic compositions falling within the scope of the present invention are given in weight percent as calculated from their respective batches, as well as prior S-glass ceramics used by McCollister for sealing nickel-base alloys.

The compositions in Table 1, being calculated from their respective batches, are not exactly the compositions of the final glass ceramics because there are small indeterminate losses during the glass melting.

TABLE I

| | Glass Ceramic | | | |
|---|---|---|---|---|
| | S | BPS | Wt % Range | Preferred Wt % Range |
| $SiO_2$ | 71.7 | 74.4 | 65–80 | 70–80 |
| $Li_2O$ | 12.6 | 12.65 | 8–16 | 12–14 |
| $Al_2O_3$ | 5.1 | 3.8 | 2–8 | 3.3–4.2 |
| $K_2O$ | 4.9 | 2.95 | 1–8 | 1.6–3.6 |
| $P_2O_5$ | 2.5 | 3.15 | 1–5 | 2.5–3.5 |
| $B_2O_3$ | 3.2 | 1.2 | 0.5–7 | 0.75–2.5 |
| ZnO | 0 | 1.85 | 0–5 | 0–3.0 |

In preparing the sealing glasses of the disclosed compositional range, the batch ingredient powder raw materials are intimately mixed by hand or in a commercially available blender, and heated to such temperatures while stirring that all of the raw materials are converted to either glass-forming or glass-modifying oxides, thereby enabling the formation of a glass from a homogeneous melt.

Generally, the batch ingredients are mixed well in a blender, and melting is done in a 100% platinum crucible or a 90% platinum—10% rhodium crucible in an electric furnace at a temperature of about 1550° C. in air of less than 25% relative humidity (the lower the better) with continuous stirring. After stirring for about 15 hr the glass is fined, i.e., trapped bubbles are allowed to float to the top of the molten glass where they burst.

The batch materials employed for preparing the glasses of the present invention are of a high purity and selected from commercially available materials. The components of the batch may be in the form of functionally equivalent phosphates, carbonates, borates or any other form which does not adversely affect the subject glass composition.

Glass having a composition as described above, prepared by the melting together of the components of a batch will not, by simple cooling to solidification, possess the necessary CTE which will match that of the nickel base, stainless steel alloys, or copper to which it is intended to be sealed. In order to obtain the desired CTE in the final glass ceramic seal, it is necessary to subject the glass to the following heat treatment in either a belt furnace or a batch process:

a. melting the glass, allowing it to flow and come into contact with the metal components, and crystallizing $Li_3PO_4$ from the fluid above 950° C. which is accomplished while the glass travels through the furnace sealing zone;

b. holding the crystalline glass ceramic at 950°–1050° C., preferably 975°–1025° C. and most preferably 1000° C. for 5–60 min, preferably 10–30 min, and most preferably 15 min, thereby creating $Li_3PO4$ which nucleates cristobalite, and forming a bond between the glass ceramic and metal components while the glass, metal components, and/or mold travel through the hot zone of the furnace;

c. cooling to about 750°–775° C. at a controlled rate of about 5°–25° C./min, causing crystallization of lithium silicates and growth of cristobalite;

d. cooling to about 580° C. at a rate of about 25° C./min producing glass ceramic material of the desired CTE; and e. cooling further to room temperature at about 5°–25° C./min.

When Inconel 718™ (a nickel-chromium-iron alloy sold by Huntington Alloys) is used as a metal to which the glass ceramic material is bonded, the Inconel 718 may be subjected to an additional precipitation hardening treatment to form an exceptionally high-strength product. The precipitation hardening treatment is preferably a two-step treatment performed in a batch furnace including the steps of maintaining the temperature of the product at 700°–750° C., preferably 725° C. for 1–8 hr, preferably 2 hr, and thereafter lowering and maintaining the temperature of the product at 595°–645° C., preferably 620° C., for 1–8 hr, preferably 2 hr. This precipitation-hardening treatment is not detrimental to the properties of the glass ceramic and can be performed after sealing and cooling in the belt furnace.

Careful control of the heat-treatment process, especially the cooling rate of the glass after sealing of the BPS glass ceramic at 1000° C. (FIG. 1), is required to obtain the desired phase assemblage and CTE of 120 to $200 \times 10^{-7}$ in/in/°C., preferably $145 \times 10^{-7}$ in/in/°C. or $165 \times 10^{-7}$ in/in/°C. The glass ceramic contains crystalline phases of lithium metasilicate ($Li_2O.SiO_2$), nucleant $Li_3PO_4$, cristobalite solid solution ($SiO_2$ SS), and minor amounts of lithium disilicate ($LiO_2.2SiO_2$). It also contains a residual glass phase, rich in oxides of potassium, aluminum, zinc, and silicon. The presence of cristobalite in the phase assemblage is essential in obtaining a high CTE for the BPS glass ceramic. The presence of zinc oxide aids the corrosion resistance of the glass ceramic and the glass-to-metal bond strength. Thermal treatment of the glass at temperatures outside the range of 950°–1050° C., where $Li_3PO_4$ doesn't form, as compared with 1000° C., does not provide adequate quantities of cristobalite to produce the necessary high CTE.

The following examples are representative embodiments and uses of a glass composition of the present invention.

EXAMPLE 1

The constituent raw materials (approx. 1200 g) of Table 2 are introduced into a twin-cone blender and mixed for about 60±10 min.

TABLE 2

| Raw Material | Weight (g) | Finished Product | Composition (wt %) |
| --- | --- | --- | --- |
| $SiO_2$ | 744.00 | $SiO_2$ | 74.40 |
| $Li_2CO_3$ | 263.62 | $Li_2O$ | 12.65 |
| $Li_3PO_4$ | 52.01 | $P_2O_5$ | 3.15 |
| $Al_2O_3$ | 38.00 | $Al_2O_3$ | 3.80 |
| $K_2CO_3$ | 44.00 | $K_2O$ | 2.95 |
| $H_3BO_3$ | 21.32 | $B_2O_3$ | 1.20 |
| ZnO | 18.50 | ZnO | 1.85 |

The resultant mixture may be stored in a covered beaker in a desiccator, or in a drying oven maintained at 125±10° C. for a maximum of about seven days prior to use. The glass powder is then melted according to the following procedure:

a) the glass powder is added batchwise to a crucible in a furnace at about 1550° C., in dry air, and the temperature is allowed to stabilize at about 1550° C. after each addition of powder until all the powder has been added and melted;

b) the glass melt is stirred with a platinum stirrer continuously at about 125 rpm for about 15 hr at 1550°±10° C.;

c) the stirrer is removed and the glass is fined for about 15 min;

d) if bubbles appear in the melt, the glass is allowed to fine further until all the bubbles have disappeared; and e) the glass is processed according to Example 2 or Example 3, below.

EXAMPLE 2

Example 2 is representative of the preparation of solid glass preforms, solid glass billets, or glass cullet using the glass composition of the present invention.

Figure 2:
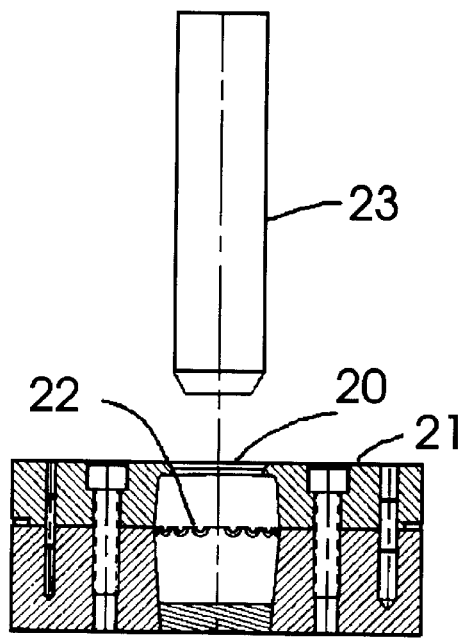
FIG. 2 is a section view of a cast iron mold used to prepare solid glass preforms from molten glass.

Solid glass preforms are prepared using the molten glass from Example 1 and the mold from FIG. 2. The bubble-free molten glass is poured into the center cavity 20 of a preheated mold 21, preferable cast iron, and then squeezed into runners 22 in the mold 21 with a plunger 23, preferably cast iron. The glass assumes the shape of the runner cavity 22. This shape can be a cylinder, half cylinder, or more usually, a half cylinder with a depression on the flat side of the cylinder to allow for pin clearance when two of these preforms are mated together. These glass shapes are removed from the mold and placed in an annealing oven at 460° C. for typically one hour. These glass pieces are then cut to desired length yielding solid glass preforms.

Solid glass billets are prepared using the molten glass from Example 1. The bubble-free molten glass is poured into the billet mold and allowed to cool until the red color is almost gone from the center of the billet. The glass is removed from the mold and placed in an oven to first stabilize its temperature, and then slowly cooled to room temperature to reduce stress in the billet.

Glass cullet is prepared using the molten glass from Example 1. The bubble-free molten glass is poured between water-cooled stainless steel rollers, poured in thin sheets onto a cold metal plate which can be copper or cast iron, or it is poured into water. In any case the glass cools quickly, breaking into small pieces known as cullet; the cullet is not annealed.

EXAMPLE 3

Example 3 demonstrates the preparation of a pressed powder preform useful in many sealing applications. The BPS glass ceramic cullet from Example 2 is ground into a powder and sieved to obtain a uniform particle size. The glass powder is then mixed with any number of binders. It is compacted with a hydraulic press in a die to form the desired shape and dimensions of the pressed powder preform. The pressed powder preform with binder is sintered in a furnace to first burn out the binder, and then to melt the glass particles such that the density of the preform is approximately 90–95% that of a solid glass.

EXAMPLE 4

Figure 3:
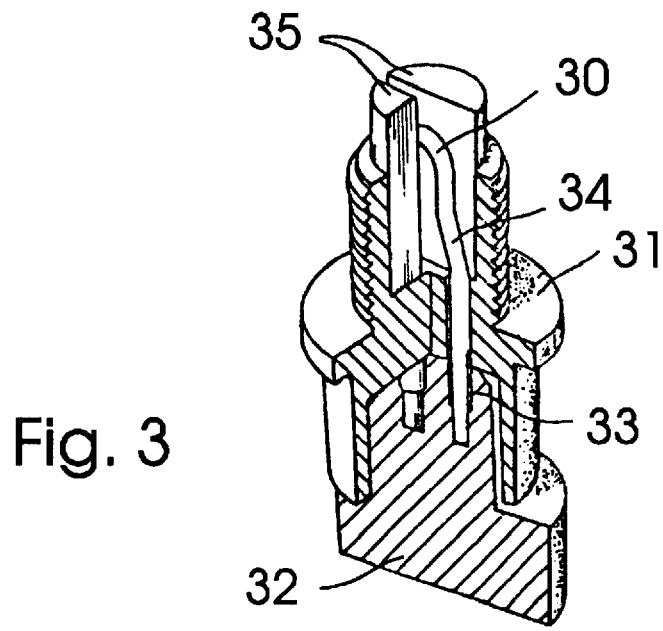
FIG. 3 is a partially broken away perspective view of a hermetic electrical header incorporating a glass ceramic seal with a body of a metal shell wherein said seal is obtained by the use of solid glass performs.

Example 4 is directed to the preparation of a header, as shown in FIG. 3, which contains a glass ceramic seal between a Hastelloy™ "hairpin" 30 and the Inconel 625™ body 31 of a header. The bottom fixture 32 contains a pair of longitudinal recesses. A tubular carbon insert 33 is pressed into each recess, leaving a small boss of carbon exposed above the fixture. The unit of FIG. 3 is assembled by placing a metal header body 31 on the bottom metal fixture 32, insuring that the two carbon bosses are engaged in the through holes in the header body 31. The lower ends of the hairpin 30 are then inserted into each of carbon inserts 33. The hairpin 30 contains a bent portion 34 in each leg. The solid glass preforms 35 from Example 2 are then placed on either side of hairpin 30. The header assembly of FIG. 3 is then subjected to heat treatment in a belt furnace capable of providing the thermal profile in FIG. 1.

The heat-treated, crystallized units are then removed from the furnace for disassembly and the header body is removed from the bottom fixture 32. Prior to electropolishing and grinding, the headers are inspected and tested. The glass ceramic in the connector end of the header is inspected under 10–20× magnification. Evidence of cracks in the glass ceramic is cause for rejection. The header is tested with a helium leak detector and any detectable leak is cause for rejection.

The metal parts are electropolished using a variable DC power supply with a stainless steel beaker as the anode and the metal part the cathode. The electropolishing solution is prepared by adding one part of concentrate (Electro-Glo 300™) to three parts by volume phosphoric acid (85% grade). The electropolishing operating voltage is 5–9 volts and the temperature of the solution is maintained at approximately 49°–54° C. The solution should not be overheated as etching of the metal occurs at approximately 66° C. Electropolishing is conducted for a total of 3 min, and the part is rinsed with tap water A cavity in the top of the header is ground out with a diamond burr, removing the 180° bend in the hairpin 30, to form two individual pins which are properly spaced and sealed within the header. The bent portions of the hairpin together with the glass ceramic seal allow the space between the ground-off ends of the hairpin to be precisely fixed.

EXAMPLE 5

Figure 4:
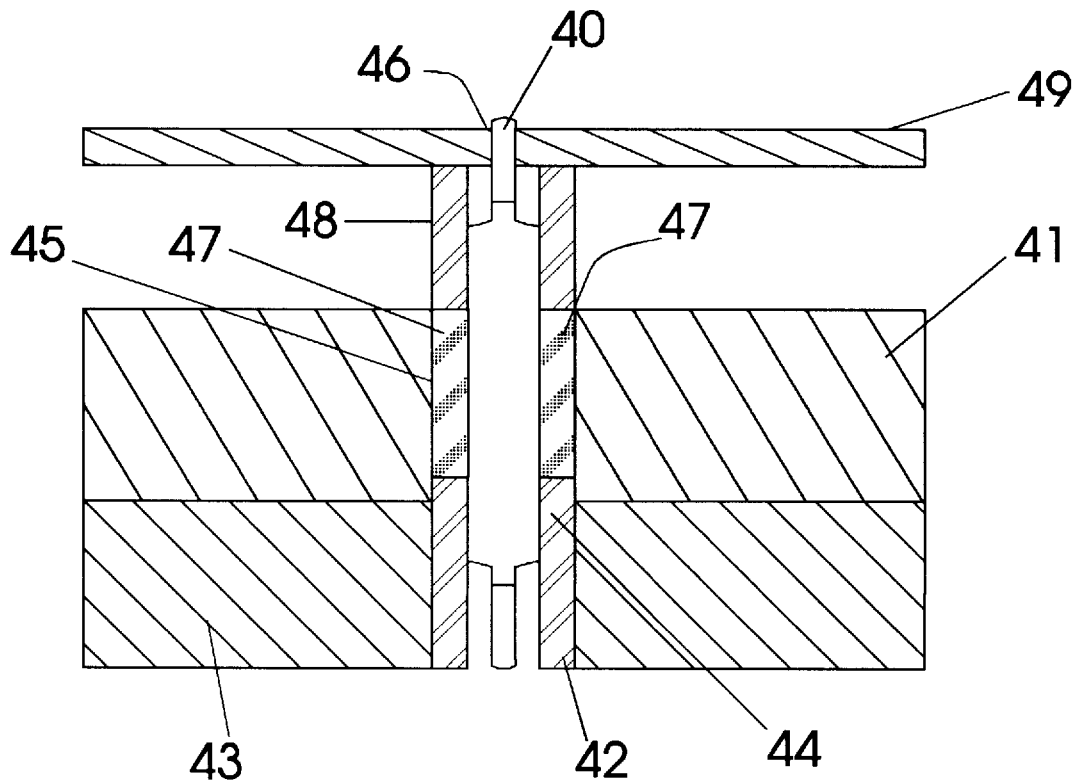
FIG. 4 is a section view of an electrical header prior to sealing with a glass ceramic pressed powder preform.

Example 5 is directed to the preparation of a header, as shown in FIG. 4, which contains a glass ceramic seal between a 330 stainless steel pin 40 and a 304 stainless steel body 41. The body 41 and pins 40 are cleaned ultrasonically in a 10-vol% solution of Oakite NST™ and water for about 10 min, and then rinsed in flowing deionized water for about 1 min followed by ultrasonic cleaning in deionized water for about 2 min. The deionized water is replaced with reagent grade 1-propanol, followed by ultrasonic agitation for an additional 1 min. The body 41 and pins 40 are then dried under an infrared heat lamp.

The bottom cylindrical carbon inserts 42 are placed in the base fixture 43 to insure that the step side 44 of the carbon 42 insert is facing up. The header body 41 is lowered on the base fixture 43 so that the through holes 45 in the body 41 capture the carbon inserts 42. One pin 40 is placed into each carbon insert 42 with the large flat in the pin 46 up. Two half-cylinder BPS pressed powder preforms 47 are placed in the through hole 45 in the body 41 and around the pin 40. This is repeated for the other three body holes 45 and pins 40. Each cylindrical top carbon insert 48 is placed over the large flat end 46 of the pins 40. Once the flats 46 on the pins 40 are rotated to the desired alignment, the top fixture 49 is lowered over the pin flats 46.

The header assembly is placed on a quartz plate, covered by an inverted quartz sealing boat, and placed on the belt at the entrance to the furnace. The belt furnace is a Transheat Model TCA64-10-90N72™ manufactured by BTU Engineering Corp. The furnace sealing parameters are as follows:

a) the first 5 zones are set at 1020° C.;

b) the next 5 zones are set at 780° C.;

c) the belt speed is 2 in/min; and d) the three nitrogen cover gas Transheat™ flowmeter settings are each set at 50.

Figure 5:
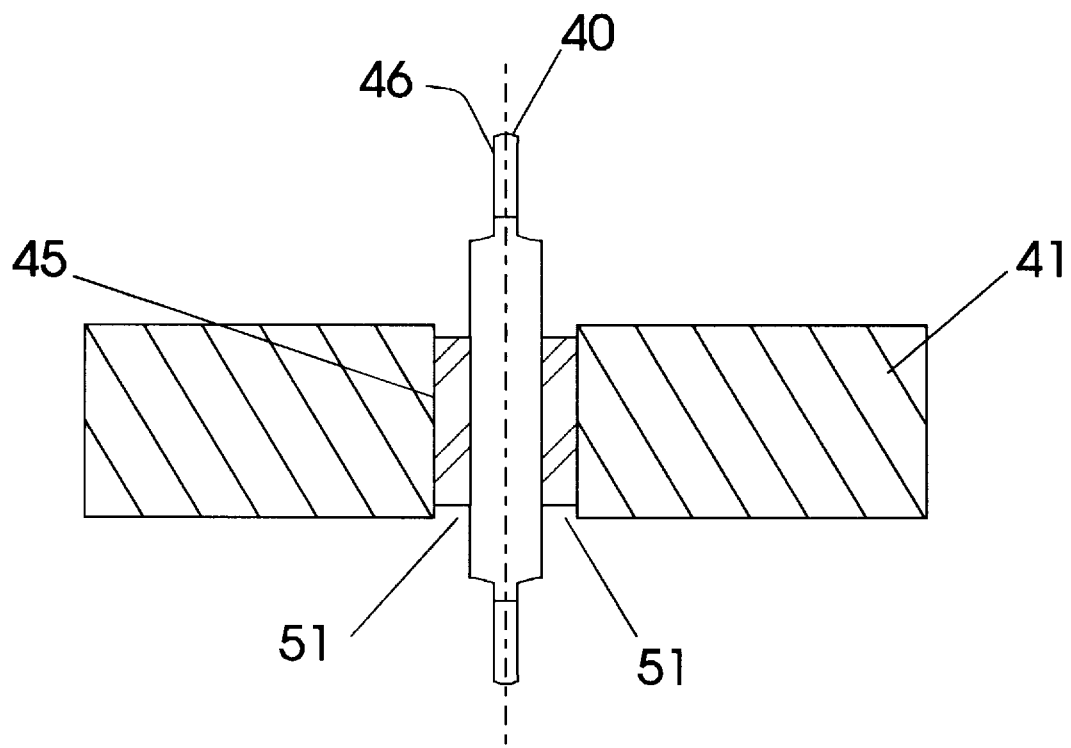
FIG. 5 is a section view of an electrical header which has been sealed with a glass ceramic.

Upon exit from the furnace, the mold assembly is disassembled and the sealed header (FIG. 5) is inspected under 10–70× magnification for defects such as non-wetting on cracks in the glass ceramic 51, or pieces of carbon mold broken off between the header body 41 and pin 40. The sealed header in FIG. 5 is then tested for hermeticity with a helium leak detector.

The oxide on the metal parts is chemically removed by soaking for about 10 min in an approximately 96°–99° C. solution containing 20 g potassium permanganate, 200 g sodium hydroxide, and 400 ml deionized water. The sealed headers are then rinsed in deionized water and dried.

EXAMPLE 6

Example 6 teaches the control of thermal expansion of the BPS glass ceramic by varying the belt furnace processing conditions. The glass ceramic composition is from within the preferred range (Table I).

Pieces of solid glass about 1.5 in long are placed in a carbon mold used to make samples for thermal expansion measurements. The mold and glass are placed on a quartz plate, covered by an inverted quartz sealing boat and placed on the belt as in Example 5. The furnace-sealing parameters are as follows:

a) the first 4 zones are set at 1020° C.; and b) the next 6 zones are set at 780° C.

Three separate runs are made with belt speeds of 3, 4, and 4.5 in/min.

Each sample of the resulting BPS glass ceramic is cut to a 1-inch length with the ends parallel using a modified Buehler Isomet™ saw fitted with two diamond impregnated blades spaced 1 inch apart. Each 1-inch long glass ceramic sample in turn is cleaned and placed on the sample side of a Theta Dual-Push Rod Dialatometera™ fitted with a 0.5%-accuracy measuring head. The Theta furnace is rolled over the quartz sample assembly and the BPS glass ceramic is heated at a rate of 2.5° C./min to 600° C. The CTE is calculated from room temperature to 250°, 460°, and 580° C., and is shown in Table 3.

TABLE 3

| CTE ($10^{-7}$ in/in/°C.) based on belt speeds at sealing temperatures | | | |
| --- | --- | --- | --- |
| Belt speed (in/min) | 250° C. | 460° C. | 580° C. |
| 3 | 202 | 165 | 163 |
| 4 | 184 | 153 | 152 |
| 4.5 | 168 | 143 | 144 |

The compositions and methods discussed above may be utilized to bond a variety of products. The compositions and methods of the present invention are particularly useful for preparing products which are subjected to high temperatures and/or high pressures, or require inexpensive, easily machined stainless steels for volume production of electronic components via belt furnace processing. Furthermore, if Inconel 718 precipitation-hardened headers are desired for component strength, the Inconel may be precipitation hardened in a batch furnace prior to the sealing process.

The invention being thus described, it will be obvious that the same may be varied in many ways. Such variations are not to be regarded as a departure from the spirit and scope of the invention, and all such modifications as would be obvious to one skilled in the art are intended to be included within the scope of this invention.

What is claimed is:

1. A method for making a bubble-free glass composition comprising:

mixing, by weight, ingredients comprising about 63.0% $SiO_2$, about 22.3% $Li_2CO_3$, about 4.4% $Li_3PO_4$, about 3.2% $Al_2O_3$, about 3.7% $K_2CO_3$, about 1.8% $H_3BO_3$, and about 1.6% ZnO;

melting the mixed ingredients while stirring at elevated temperature in air, of less than 25% relative humidity, for a time sufficient to form a homogeneous glass melt;

allowing the glass melt to fine whereby bubbles in the melt rise to the surface and burst; and allowing the glass melt to solidify to a bubble-free glass composition comprised of, by weight %, 74.4% $SiO_2$, 3.8% $Al_2O_3$, 1.2% $B_2O_3$, 3.15% $P_2O_5$, 2.95% $K_2O$, 12.65% $Li_2O$, and 1.85% ZnO.

2. A product made by the method of claim 1.

3. A product made by the method of claim 1 prepared from phosphates, carbonates, or borates which are functionally equivalent to the phosphates, carbonates, and borates of claim 1.

4. A method for making bubble-free preforms from the bubble-free molten glass of claim 1 comprising:

pouring the molten glass into the center cavity of a preheated mold;

squeezing the molten glass into runners in the mold with a plunger;

allowing the molten glass to solidify;

removing the solidified glass from the mold and annealing it at about 460° C. for about one hour; and cutting the solid glass to desired preform lengths.

5. A product made by the method of claim 4.

6. A method for making bubble-free billets from the bubble-free molten glass of claim 1 comprising:

pouring the molten glass into a billet mold;

allowing the molten glass to solidify and further cool until the center of the billet is almost free of red color;

removing the solidified glass from the mold and stabilizing the temperature throughout the billet in an oven; and cooling the billet slowly to room temperature to reduce stress in the billet.

7. A product made by the method of claim 6.

8. A method for making bubble-free glass cullet from the bubble-free molten glass of claim 1 comprising pouring the molten glass between water-cooled stainless steel rollers, pouring the molten glass in thin sheets onto a cold metal plate or into water thereby solidifying the glass and causing it to break under thermal stress into small pieces or cullet.

9. A method for making pressed-powder preforms from the glass cullet of claim 8 comprising:

grinding the cullet into powder;

sieving the powder to obtain a uniform particle size;

mixing the powder with a binder;

compacting the powder/binder mixture to the desired shape and dimensions of the preform; and sintering the compact to burn away the binder and melt the glass particles such that the density of the preform is about 90% to about 95% that of the solid glass.

10. A product made by the method of claim 9.

11. A method of making a glass ceramic from a solid glass composition consisting of, by weight %, 73.5–74.9% $SiO_2$, 3.3–4.2% $Al_2O_3$, 1.0–2.5% $B_2O_3$, 2.45–3.35% $P_2O_5$, 2.7–3.6% $K_2O$, 12.3–13.9% $Li_2O$, and 0–2.2% ZnO comprising:

melting the glass composition by heating it to about 950°–1050° C. causing crystallization of $Li_3PO_4$ necessary for the nucleation of cristobalite from the glass composition, thereby forming first-precursor glass ceramic;

holding the first-precursor glass ceramic at a temperature of between 950°–1050° C. for sufficient time to create cristobalite nuclei, thereby forming second-precursor glass ceramic;

cooling the second-precursor glass ceramic to a temperature of between 750°–775° C. at a controlled rate of about 5°–25° C./min to cause crystallization of lithium silicates and growth of cristobalite, thereby forming the final glass ceramic product;

further cooling the the final glass ceramic product to about 580° C. at a cooling rate of about 25° C./min; and still further cooling the the final glass ceramic product at a controlled rate to ambient temperature producing a glass ceramic with a the coefficient of thermal expansion of from about $120 \times 10^{-7}$ in/in/°C. to about $200 \times 10^{-7}$ in/in/°C.

12. A product made by the method of claim 11.

13. The method of claim 11 wherein the first-precursor glass ceramic is held at about 1000° C. for about 15 min.

14. The method of claim 11 wherein the second-precursor glass ceramic is cooled to about 750° C. at a rate of about 10° C./min.

15. A product made by the method of claim 11 wherein the coefficient of thermal expansion is about $145 \times 10^{-7}$ in/in/°C.

16. The method of claim 11 wherein the solid glass composition is in the form of a pressed-powder glass preform.

17. The method of claim 11 wherein the solid glass composition is in the form of a solid glass billet.

18. The method of claim 11 wherein the solid glass composition is in the form of a solid glass preform.

19. A method for making a hermetic seal, in a traveling belt furnace, between a glass ceramic of claim 11 and a metal or a metal alloy, both having substantially the same coefficient of thermal expansion, comprising:

melting a glass composition of claim 11 by heating the glass composition and metal or metal alloy, in mutual contact, to about 950°–1050° C. while they pass through the furnace temperature-sealing zone, causing crystallization of $Li_3PO_4$ necessary for the nucleation of cristobalite from the glass composition, thereby forming first-precursor glass ceramic;

holding the first-precursor glass ceramic and a metal or metal alloy at a temperature of between 950°–1050° C. for sufficient time to create cristobalite nuclei in the first-precursor glass ceramic, thereby forming second-precursor glass ceramic;

cooling the second-precursor glass ceramic and a metal or metal alloy to a temperature of between 750°–775° C. at a controlled rate of about 5°–25° C./min to cause crystallization of lithium silicates and growth of cristobalite in the second-precursor glass ceramic, thereby forming the final glass ceramic product;

further cooling the the final glass ceramic product and a metal or metal alloy to about 580° C. at a cooling rate of about 25° C./min; and still further cooling the the final glass ceramic product and a metal or metal alloy at a controlled rate to ambient temperature.

20. A product made by the method of claim 19.

21. The method of claim 19 wherein the metal alloy is Inconel 718.

22. The method of claim 19 wherein the metal alloy is Inconel 625.

23. The method of claim 19 wherein the metal alloy is Hastelloy.

24. The method of claim 19 wherein the metal alloy is Haynes Alloy 242.

25. The method of claim 19 wherein the metal alloy is stainless steel.

26. The method of claim 19 wherein the metal alloy is nitronic steel.

27. The method of claim 19 wherein the metal is copper.

28. A glass ceramic-to-metal alloy hermetic seal product made by the method of claim 19 wherein the metal alloy is Inconel 718.

29. A glass ceramic-to-metal alloy hermetic seal product made by the method of claim 19 wherein the metal alloy is Inconel 625.

30. A glass ceramic-to-metal alloy hermetic seal product made by the method of claim 19 wherein the metal alloy is Hastelloy.

31. A glass ceramic-to-metal alloy hermetic seal product made by the method of claim 19 wherein the metal alloy is Haynes Alloy 242.

32. A glass ceramic-to-metal alloy hermetic seal product made by the method of claim 19 wherein the metal alloy is stainless steel.

33. A glass ceramic-to-metal alloy hermetic seal product made by the method of claim 19 wherein the metal alloy is nitronic steel.

34. A glass ceramic-to-metal hermetic seal product made by the method of claim 19 wherein the metal is copper.

35. A method of precipitation-hardening the Inconel 718 of the glass ceramic-to-Inconel 718 hermetic seal product of claim 28 to strengthen the Inconel 718 without compromising the seal, comprising:
  a. heating the seal in a batch furnace at from about 700° C. to about 750° C. for about one to about 8 hours;
  b. lowering and maintaining the temperature of the seal at from about 595° C. to about 645° C. for about one to about 8 hours; and
  c. cooling the seal to ambient temperature.

36. The method of claim 19 wherein the glass composition is in the form of a solid glass preform.

37. The method of claim 19 wherein the glass composition is in the form of a pressed powder preform.

38. An electrical header product made by the method of claim 19 wherein the glass composition is in the form of a solid glass preform.

39. An electrical header product made by the method of claim 19 wherein the glass composition is in the form of a pressed powder preform.

* * * * *